United States Patent
Didi et al.

(10) Patent No.: US 8,301,170 B2
(45) Date of Patent: Oct. 30, 2012

(54) METHOD OF LOCATING A RADIOCOMMUNICATION DEVICE, CORRESPONDING COMPUTER PROGRAM PRODUCT, STORAGE MEANS AND RADIOCOMMUNICATION MODULE

(75) Inventors: Thierry Didi, Paris (FR); Christophe Flechelle, Colombes (FR)

(73) Assignee: Sierra Wireless, Issy les Moulineaux Cedex (FR)

( * ) Notice: Subject to any disclaimer, the term of this patent is extended or adjusted under 35 U.S.C. 154(b) by 0 days.

(21) Appl. No.: 13/000,566

(22) PCT Filed: Jun. 16, 2009

(86) PCT No.: PCT/EP2009/057494
§ 371 (c)(1),
(2), (4) Date: May 27, 2011

(87) PCT Pub. No.: WO2009/156311
PCT Pub. Date: Dec. 30, 2009

(65) Prior Publication Data
US 2011/0312323 A1    Dec. 22, 2011

(30) Foreign Application Priority Data
Jun. 27, 2008  (FR) ..................... 08 54323

(51) Int. Cl.
H04W 24/00  (2009.01)
H04W 4/00  (2009.01)

(52) U.S. Cl. ................... 455/456.3; 455/456.1; 455/434

(58) Field of Classification Search ............... 455/435.1, 455/552.1, 456.1, 41.2, 434, 456.6, 456.3; 375/141, 322, 132; 370/252, 329
See application file for complete search history.

(56) References Cited

U.S. PATENT DOCUMENTS
2007/0135140 A1* 6/2007 Tervo .................. 455/456.6

FOREIGN PATENT DOCUMENTS
| EP | 1768280 A1 | 3/2007 |
| WO | 0251192 A1 | 6/2002 |
| WO | 2004016032 A1 | 2/2004 |
| WO | 2004036240 A2 | 4/2004 |
| WO | 2006086398 A2 | 8/2006 |
| WO | 2008056864 A1 | 5/2008 |

OTHER PUBLICATIONS

French Search Report dated Mar. 25, 2009, for French Application No. 0854323, filed Jun. 27, 2008.
International Search Report dated Apr. 8, 2009, for International Application No. PCT/EP2009/057494, filed Jun. 16, 2009.
English translation of Preliminary Report on Patentability and Written Opinion dated Jan. 3, 2011, for corresponding International Application No. PCT/EP2009/057494, filed Jun. 16, 2009.

* cited by examiner

Primary Examiner — Kiet Doan
(74) Attorney, Agent, or Firm — David D. Brush; Westman, Champlin & Kelly, P.A.

(57) ABSTRACT

A method is provided for locating a radiocommunication device in a radiocommunication network comprising a plurality of distinct geographical cells. The device comprises a radiocommunication module allowing reception of radiocommunication carriers. Each carrier is associated with a cell of the network and is defined by a frequency and a cell identifier. The module performs the following steps: obtaining initialization information comprising a predetermined list of N1 reference carriers; selecting N carrier(s) from among the N1 reference carriers; for each carrier selected, determining the cell identifier, termed the current cell identifier, associated with the selected carrier, on the basis of system information messages conveyed by the carrier; and obtaining an item of information regarding the location of the radiocommunication device, on the basis of the current cell identifier or identifiers.

16 Claims, 3 Drawing Sheets

METHOD OF LOCATING A RADIOCOMMUNICATION DEVICE, CORRESPONDING COMPUTER PROGRAM PRODUCT, STORAGE MEANS AND RADIOCOMMUNICATION MODULE

CROSS-REFERENCE TO RELATED APPLICATIONS

This Application is a Section 371 National Stage Application of International Application No. PCT/EP2009/057494, filed Jun. 16, 2009 and published as WO 2009/156311 on Dec. 30, 2009, not in English.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The field of the disclosure is that of radiocommunications and more particularly radiocommunication devices comprising an electronic radiocommunication module. The aforementioned radiocommunication module is compliant with a radiocommunication standard such as in particular, but not exclusively, GSM ("Global System for Mobile"), GPRS ("Global Packet Radio Service"), UMTS ("Universal Mobile Telecommunications Service"), WCDMA ("Wideband Code Division Multiple Access"), WiFi ("Wireless Fidelity"), the Bluetooth standard, etc.

More precisely, the disclosure relates to a locating technique of such devices.

The disclosure has in particular applications in the field of monitoring objects, animals or individuals.

As such, the disclosure applies in particular, but not exclusively, to GSM positioning systems that make it possible, for example, to detect the geographical position of a vehicle. The disclosure has applications in particular in the field of remote payment systems.

BACKGROUND OF THE DISCLOSURE

Currently, an increasing number of users are using the new locating services (also referred to as position determination services, or LBS for "Location Based Services").

Locating has many applications. The user can for example use it to find the nearest hotel or restaurant, obtain tourist information about the place that he is visiting. Worried parents can locate their child at any time. Professionals can locate their vehicles, track personnel, deliveries and detect any problems (for example, the stopping of a merchandise lorry in an unauthorised zone).

Two major families in locating methods are known: the GPS method of locating ("Global Positioning System") and the GSM method of locating.

The GPS technology has enjoyed remarkable success, in particular thanks to the navigation assistance services for motorists. Conventionally, GPS locating is carried out via the reception, via a GPS positioning system comprising a GPS locating module (also called GPS module in what follows), of signals coming from several satellites located in orbit. The GPS module then decodes these signals in order to determine the geographical position of the system.

The major inconvenience of the aforementioned GPS positioning system resides in the fact that the GPS module is constantly on. As such, the electrical consumption of such a system is not optimal.

Among the various GSM locating techniques, one known technique, called Cell-ID (cell identification), consists in locating a radiocommunication device comprising a radiocommunication module (also called GSM module in what follows), for example a mobile terminal, using the address of a BTS (Base Transceiver Station") whereon is locked the mobile terminal.

In relation with FIG. 1, a flowchart showing the steps of the Cell-ID technique is presented.

Recall first of all that a GSM radiocommunication network includes a plurality of distinct geographical cells. Each cell of the network comprises a BTS making it possible to emit a BCCH carrier ("Broadcast Control Channel") (also called radiocommunication carrier in what follows) to the radiocommunication devices located in the cell. Each radiocommunication carrier conveys a plurality of information messages (also called system information messages in what follows) on the access rules to the current cell and to the neighbouring cells (minimum and maximum power level, locating zone number, etc.). These system information messages are of a number of 8 and are, in general, noted SYS_INFO 1 to SYS_INFO 8. These system information messages are well known to those skilled in the art and therefore are not described in detail. However, recall that, among the system information messages conveyed by the carrier, the system information message SYS_INFO 3 includes the identifier of the CID cell (for "Cell Identity") associated with the carrier.

In a first step E1, the radiocommunication module, included in the radiocommunication device which is placed in a current geographical zone, receives carriers for example from a public land network of a mobile telecommunications operator (for example the GSM network of the operator SFR). More precisely, during this step E1, the radiocommunication module implements a scanning of the radiofrequency spectrum in such a way as to detect radiocommunication carriers.

During a step E2, the radiocommunication module implements a carrier selection algorithm. Conventionally, selecting consists in classifying the carriers detected in the step E1 in a decreasing order of power level, then in selecting the one or those which have a power level greater than the noise level.

During a step E3, the radiocommunication module implements a synchronisation algorithm which makes it possible to determine, from among the carriers selected in the step E2, the carrier whereon it can be synchronised.

During a step E4, the radiocommunication module is synchronised on the carrier determined in the step E3. In other terms, the radiocommunication device locks onto the BTS having emitted the carrier determined in the step E3.

During a step E5, the radiocommunication module reads and decodes all of the system information messages (SYS_INFO 1 to SYS_INFO 8) conveyed by the carrier whereon it is synchronised. As such, at the end of this step E5, the module obtains the identifier of the cell associated with the carrier whereon it is synchronised.

During a step E6, the radiocommunication module sends to a remote locating server the cell identifier obtained in the step E5.

Then, during a step E7, the locating server converts the cell identifier into coordinates of the geographical position.

Finally, during a step E8, the radiocommunication module receives the coordinates of the geographical position sent by the locating server.

The Cell-ID technique (GSM locating technique) represented major progress in the detection of the position of an object or of an individual. However, it has a certain number of disadvantages.

First of all, this known technique has the disadvantage of implementing one or several locating servers which are complex and expensive.

Another disadvantage of this Cell-ID technique, resides in the fact that, in order to obtain position information, it requires the implementation of a full scanning of the radiofrequency spectrum (aforementioned step E1), of a decoding of all of the system information messages (aforementioned step E5), and of a data exchange with a locating server (aforementioned steps E6 and E8). The implementation of such algorithms (scanning, decoding, and data exchanges) is expensive in terms of calculation resources and electrical consumption.

SUMMARY

In a particular embodiment of the invention, there is proposed a method of locating a radiocommunication device in a radiocommunication network including a plurality of distinct geographical cells, said radiocommunication device comprising a radiocommunication module making it possible to receive radiocommunication carriers, each carrier being associated with a cell of said network and being defined by a frequency and an identifier of said cell.

According to an embodiment of the invention, the module performs the following steps:
  obtaining initialisation information including a predetermined list of N1 reference carriers, with $N1 \geq 1$;
  selecting N carrier(s) from among the N1 reference carriers, with $1 \leq N \leq N1$;
  for each carrier selected, determining the cell identifier (Cell_ID), referred to as the current cell identifier, associated with said carrier selected, using the system information messages conveyed by said carrier;
  obtaining information regarding the location of said radiocommunication device, using the current cell identifier or identifiers.

As such, an embodiment of the invention is based on an entirely new and inventive approach in the locating of a radiocommunication device. Indeed, an embodiment of the invention is based on the obtaining of a limited and predetermined list of carriers to be analysed by the radiocommunication module.

An embodiment of the invention proposes on the one hand to obtain initialisation information making it possible to reduce the number of cell identifiers determined by the module, and on the other hand to obtain information regarding the location using cell identifiers, without processing the latter by a complex and expensive server.

An embodiment of the invention therefore makes it possible to reduce the electrical consumption and the calculation resources used by the module. Indeed, contrary to the aforementioned conventional Cell-ID technique, the implementation of a full scanning of the radiofrequency spectrum is avoided.

According to an embodiment of the invention, the list of N1 reference carriers can be obtained automatically or selected manually by a user (via a man/machine interface).

According to an advantageous aspect of an embodiment of the invention, said initialisation information further includes, for each reference carrier, the cell identifier associated with said reference carrier, referred to as reference cell identifier. According to an embodiment of the invention, the module furthermore performs the following step:
  detecting a position of said radiocommunication device in a reference geographical zone, using the current cell identifier or identifiers and the reference cell identifier or identifiers.

An embodiment of the invention covers a first case wherein detecting the position is accomplished via the searching in a list of cell identifiers (called reference identifiers) of a single current cell identifier. As such, the geographical position of the radiocommunication device is determined using signals (BCCH carrier) sent by a single base station. In this first case, a position of the radiocommunication device is detected in a given geographical cell.

An embodiment of the invention covers a second case wherein detecting the position is accomplished via the searching in a list of cell identifiers (called reference identifiers) of several current cell identifiers. As such, the geographical position of the radiocommunication device is determined using signals (BCCH carriers) sent by several base stations. This second case has the advantage of detecting the position of the radiocommunication device with better precision, due to the fact that it is possible to cross the signals of several base stations.

Note that it is also the result of knowing that the radiocommunication module does not receive any reference carrier. Indeed, this means that the radiocommunication device is not located in a predetermined reference geographical zone.

Advantageously, said initialisation information further includes, for each reference carrier, the power level of said reference carrier, referred to as reference power level. According to an embodiment of the invention, the module performs the following steps:
  for each carrier selected, determining the power level, referred to as the current power level, associated with said carrier selected;
  detecting of said position of said radiocommunication device in said reference geographical zone, according furthermore to the current power level or levels and of the reference power level or levels.

As such, in a particular embodiment, the detection of the position of the radiocommunication device is according to:
  the result of the comparison of the cell identifiers measured and the reference cell identifiers; and
  the result of the comparison of the power levels measured and the reference power levels.

In an embodiment of the invention, in the case of a positive detection of said radiocommunication device in a reference geographical zone, said method comprises a step of activating a locating module (GPS) included in the radiocommunication device.

As such, an embodiment of the invention is based on an entirely new and inventive approach for the activation of a locating module (GPS for example). Indeed, the activation of the locating module is conditioned by the detection of a position of the radiocommunication device in a reference geographical zone. Contrary to conventional GPS locating methods, an embodiment of the invention makes it possible to reduce the electrical consumption associated with the locating module, since the latter is no longer constantly on.

In a first particular embodiment of the invention, said step of obtaining said initialisation information comprises a step of reading said initialisation information in a storage means included in the radiocommunication device.

In a second particular embodiment of the invention, said step of obtaining said initialisation information comprises the following step:

said module receives said initialisation information coming from a source equipment.

According to an embodiment of the invention, the initialisation information can be received via a wired link (for example, the radiocommunication device can be connected to a terminal comprising the initialisation information by means of a USB cable) or wireless (for example, the radiocommunication device can receive an SMS (for "Short Message Service") comprising the initialisation information).

Preferentially, the source equipment is a spy device. According to an embodiment of the invention, the predetermined list of N1 reference carriers contains at least certain of the carriers received by the spy device.

By spy device is meant a radiocommunication device placed in a predetermined geographical zone and configured to receive and transmit radiocommunication carriers to radiocommunication modules.

Advantageously, the source equipment is a server storing said initialisation information.

Advantageously, the server receives said initialisation information from said spy device.

An embodiment of the invention covers a first case wherein the server and the spy device are included in the same piece of equipment.

An embodiment of the invention covers a second case wherein the server and the spy device are included in two distinct pieces of equipment.

According to an advantageous aspect of an embodiment of the invention, each carrier conveys a plurality of system information messages among which a specific system information message including a cell identifier associated with said carrier. According to an embodiment of the invention, the step of determining the current cell identifier of each carrier selected comprises a step of reading and decoding only said specific system information message comprising said cell identifier.

As indicated previously, the conventional Cell-ID technique implements a decoding of all of the system information messages conveyed by a carrier. On the other hand, an embodiment of the invention proposes to implement the decoding of a single one of these system information messages. As such, an embodiment of the invention makes it possible to reduce the electrical consumption and the calculation resources used by the radiocommunication module.

Advantageously, said specific system information message is a message of the SYS_INFO 3 type.

Advantageously, the step of selecting N carrier(s) is carried out in decreasing order of power level of reception by the radiocommunication module.

Advantageously, the radiocommunication device carries out a step of transmitting of said initialisation information to at least one other radiocommunication device of said radiocommunication network. As such, in a particular embodiment of the invention, the radiocommunication device itself can act as a spy device. In other terms, at a given moment in its life the radiocommunication device can transmit radiocommunication carrier information to other radiocommunication devices implementing the locating method of an embodiment of the invention.

In another embodiment, the invention relates to a computer program product which can be downloaded from a communication network and/or recorded on a support which can be read by a computer and/or which can be executed by a processor, said computer program product comprising program code instructions for the implementation of the aforementioned method of locating, when said program is executed on a computer.

In another embodiment, the invention relates to a storage means, which may be partially or entirely removable, which can be read by a computer, storing a set of instructions that can be executed by said computer in order to implement the aforementioned locating method.

In another embodiment, the invention relates to a radiocommunication module of the type making possible the receiving of radiocommunication carriers, each carrier being associated with a geographical cell of a radiocommunication network comprising a plurality of distinct geographical cells, and being defined by a frequency and an identifier of said cell, said module being comprised in a radiocommunication device. According to the invention, the module comprises:

means for obtaining initialisation information comprising a predetermined list of N1 reference carriers, with $N \geq 1$;

means for selecting N carrier(s) from among the N1 reference carriers, with $1 \leq N \leq N1$;

means for determining making it possible, for each carrier selected by said means for selecting, to determine the cell identifier (Cell_ID), referred to as the current cell identifier, associated with said carrier selected, using the system information messages conveyed by said carrier;

means for obtaining information regarding the location of said radiocommunication device in said radiocommunication network, using the current cell identifier or identifiers.

BRIEF DESCRIPTION OF THE DRAWINGS

Other characteristics and advantages shall appear more clearly when reading the following description of a preferred embodiment, provided as a simple and non-limiting example, and of the annexed drawings, wherein.

DETAILED DESCRIPTION OF ILLUSTRATIVE EMBODIMENTS

Figure 1:
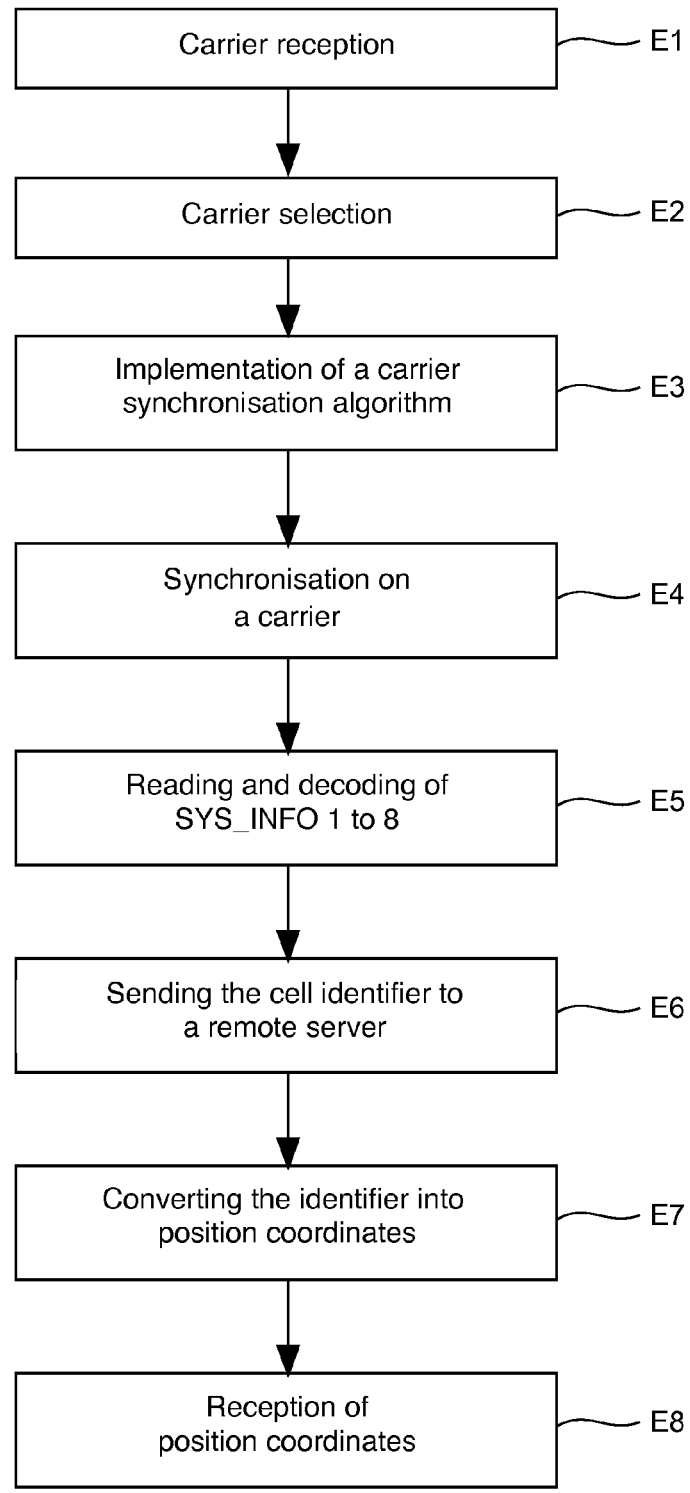
FIG. 1, already addressed in relation with prior art, shows a flowchart showing the steps of the conventional Cell-ID technique.

The general principle of an embodiment of the invention is based on the locating of a radiocommunication device comprising a radiocommunication module, using cell identifiers determined by the radiocommunication module.

As already indicated, an embodiment of the invention implements the decoding of a limited and predetermined number of carriers.

The method of locating according to an embodiment of the invention is implemented in the aforementioned radiocommunication module. In a particular embodiment, the radiocommunication module can include a first module dedicated to the reception of radiocommunication carriers and a second module dedicated to the processing of the carriers received. In this particular embodiment, the method of locating is implemented in the second module.

With a concern for simplifying the description, we shall limit, in all of the rest of this document, the description to the particular case wherein the initialisation information of an embodiment of the invention is stored in a memory included in a radiocommunication device and cooperating with a radiocommunication module making possible the reception of GSM carriers. Of course, the invention applies to any other type of carrier, in particular, but not exclusively, to carriers emitted by specific antennas (in the WiFi standard, etc.).

In relation with FIG. 2 a radiocommunication device 200 shall now be described according to a particular embodiment of the invention.

In this embodiment, the locating device 200 comprises a radiocommunication module GSM 21 that is specific to an embodiment of the invention itself comprising:
  means for obtaining initialisation information 211 specific to an embodiment of the invention;
  conventional means for selecting carriers 212;
  means for determining 213 cell identifiers specific to an embodiment of the invention;
  means for obtaining information regarding the location 214 specific to an embodiment of the invention; and
  means for detecting the position 215 that are specific to an embodiment of the invention.

In a more detailed manner, at start-up (referenced as "instant t0" in FIG. 2), the radiocommunication module GSM 21 is activated and the GPS locating module 216 is placed in an idle mode. At instant t0, the radiocommunication module GSM 21 receives GSM carriers (also called BCCH beacons in GSM terminology) P1(F1,N1) to P5(F5,N5) via an antenna 218. Each of the GSM carriers detected (P1 to P5) is characterised by a frequency carrier (F1 to F5) and a power level (N1 to N5). At this same instant t0, the radiocommunication module GSM 21 reads initialisation information stored in the memory 217.

In a particular embodiment of the invention, the initialisation information comes from, for example, a spy device (i.e. a radiocommunication device comprising means making it possible to detect radiocommunication carriers) placed in a reference geographical zone wherein it is desired to provide surveillance (i.e. a zone wherein it is desired, for example, to detect or not detect the presence of the radiocommunication device). It is important to note that the initialisation information includes a list of reference carriers including all or a portion of the carriers received by the spy device. The initialisation information sent (for example, via a WiFi link) by the spy device is received by the radiocommunication module GSM 21 (for example, via the antenna 218), then stored in the memory 217.

In the embodiment shown, the initialisation information 2171 includes a list of two reference carriers P1(F1) and P4(F4), the reference carrier P1 being associated with a reference cell identifier ID1 and the reference carrier P4 with a reference cell identifier ID4. As such, the initialisation information makes it possible to indicate to the module that it must take into consideration only the carriers P1 and P4 for the following step of the method according to an embodiment of the invention. The carriers P2, P3 and P5 received by the radiocommunication module GSM 21 are not processed.

At an instant t0+1, the carriers P1 and P4 (received via the antenna 218) are transmitted to the means for selecting carriers 212. The means for selecting 212 implement a carrier selection algorithm which can be expressed in the following way: from among the reference GSM carriers received P1 and P4, selection of the carrier or carriers having a power level that is higher than the noise level. This selection is carried out in decreasing order of power level. In the example described, it is considered that the levels N1 and N4 are higher than the noise level.

The carriers selected P1(F1,N1) and P4(F4,N4) can then be stored in the memory 217.

At an instant t0+2, the carriers selected P1 and P4 are transmitted to the means for determining 213. As indicated previously, each carrier conveys a plurality of system information messages SYS_INFO 1 to SYS_INFO 8 among which a specific system information message SYS_INFO 3 including a cell identifier associated with the carrier.

At this instant t0+2, the means for determining 213 read and decode only the system information message SYS_INFO 3 of each of the carriers selected P1 and P4, in such a way as to obtain the cell identifier associated with the carrier selected, called in what follows the current cell identifier.

Figure 2:
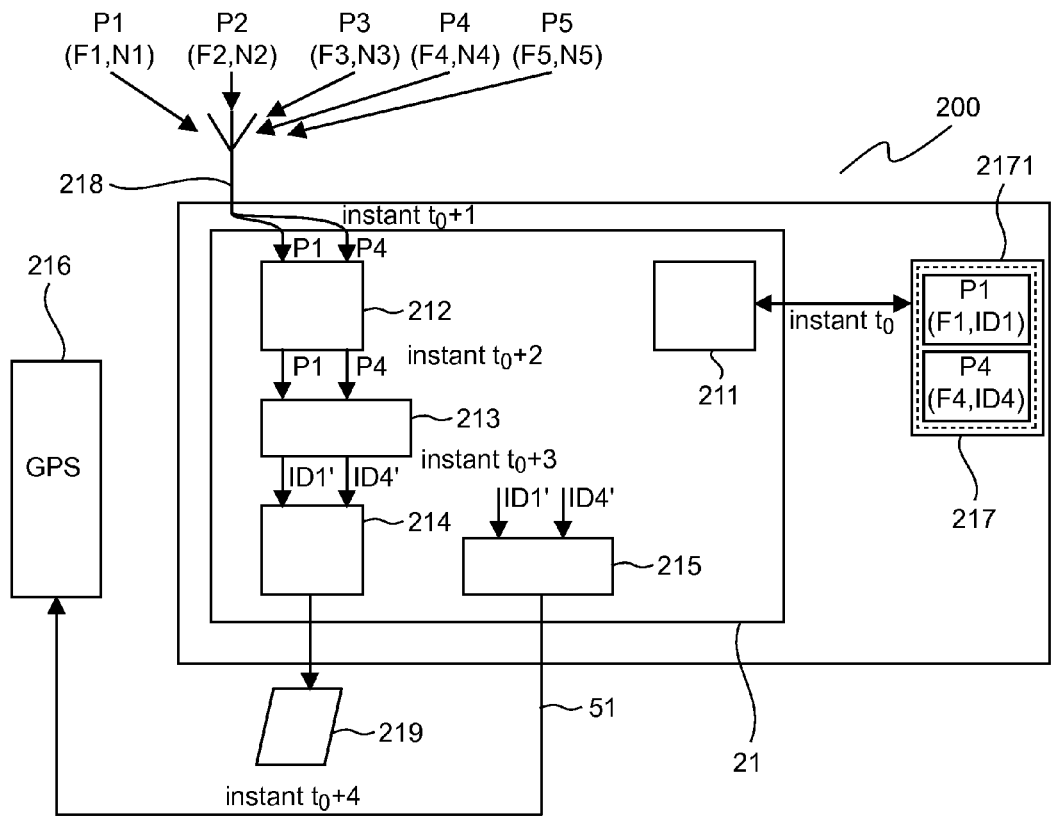
FIG. 2 shows the simplified diagram of a radiocommunication device according to a particular embodiment of the invention.

As such, as shown in FIG. 2, the means for determining 213 receive as input two carriers selected P1 and P4 and deliver as output two current cell identifiers ID1' and ID4'.

In a first particular embodiment of the invention, at an instant t0+3, the means for obtaining 214 receive the two current cell identifiers ID1' and ID4' and deliver information regarding the location 219 using these current cell identifiers. Such information regarding the location can then be provided to a user via a man/machine interface, for example an LCD display screen.

In a second particular embodiment of the invention, at the instant t0+3, the means for detection the position 215 receive the two current cell identifiers ID1' and ID4' and deliver an activation signal S1.

Finally, at an instant t0+4, the GPS locating module 216 is activated by the activation signal S1.

Figure 3:
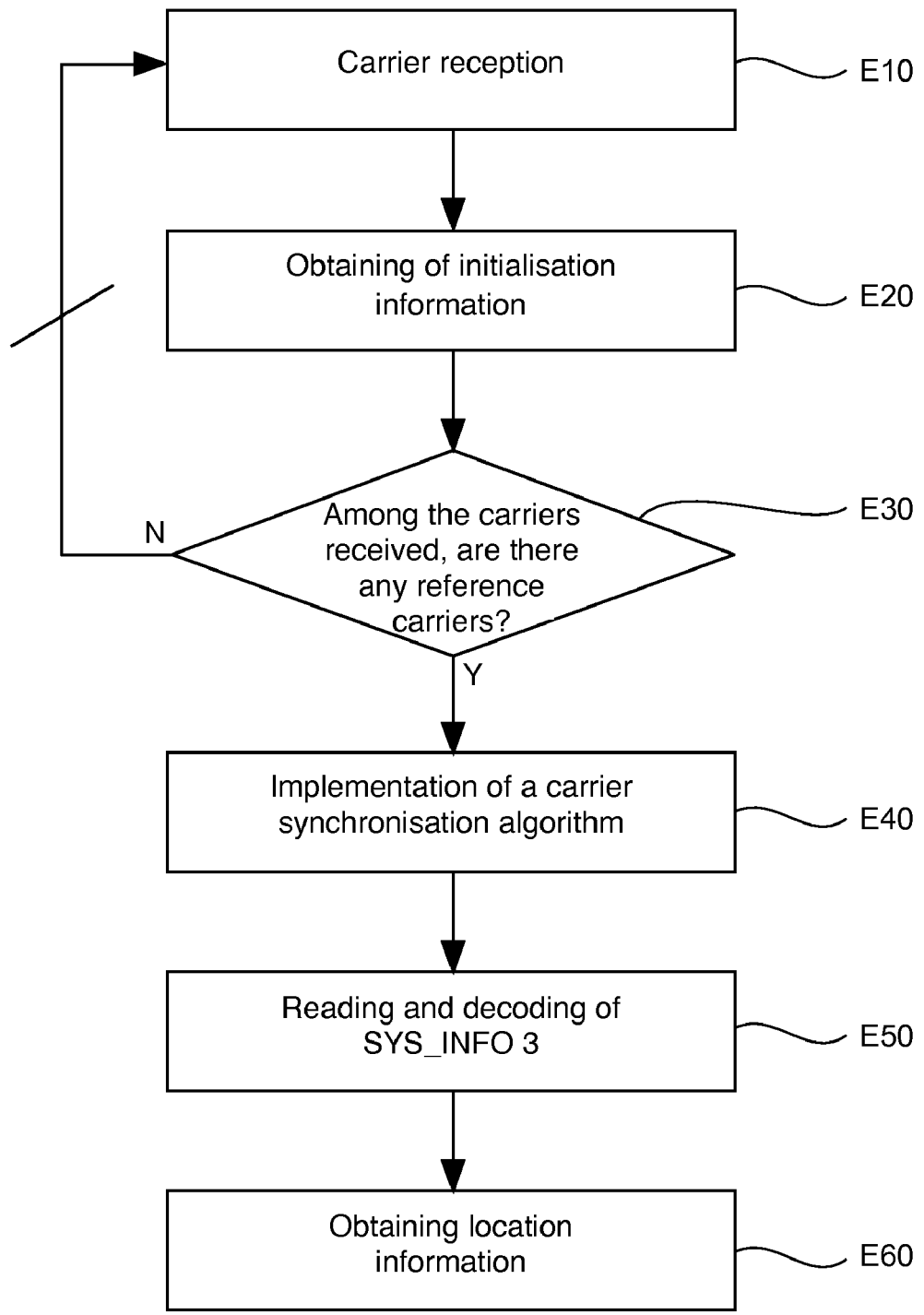
FIG. 3 shows a flowchart showing a particular embodiment of the method according to an embodiment of the invention, in the case where the initialisation information is stored in an internal memory of the radiocommunication device in FIG. 2.

In relation with FIG. 3, a flowchart is presented showing a particular embodiment of the method according to the invention, in the case where the initialisation information is stored in an internal memory of the radiocommunication device.

In a first step E10, the radiocommunication module GSM 21, included in the radiocommunication device 200 which is placed in a current geographical zone, receives carriers for example from a public land network of a mobile telecommunications operator (for example the GSM network of the operator SFR).

During a step E20, the module obtains initialisation information. More precisely, the means for obtaining 211 read the initialisation information stored in the memory 217. In a particular embodiment, the initialisation information includes a predetermined list of N1 reference carriers, with $N \geq 1$, and reference cell identifiers.

During a step E30, the module verifies if, from among the carries that it has received, there is at least one of the reference carriers (included in the list obtained in the step E20).

If the module does not receive any reference carrier, then this means that the radiocommunication device 200 is not located in a predetermined geographical monitoring zone and control is returned to the step E10.

However, if the module receives at least one reference carrier, then this means that the radiocommunication device 200 is located in a predetermined geographical monitoring zone and control is passed to a step E40.

During the step E40, the means for selecting 212 implement a reference carrier selection algorithm. In a particular embodiment, the selection can consist in classifying the reference carriers in a decreasing order of power level, then in selecting the one or those having a power level that is higher than the noise level. The means for selecting 212 then transmit the carriers selected to the means for determining 213.

Then, during a step E50, the means for determining 213 receive the carriers selected. For each of the carried selected received, the means for determining read and decode the system information message SYS_INFO 3 conveyed by the carrier, in such a way as to obtain the cell identifier associated with the carrier. At the end of this step E50, the means for determining 213 transmit current cell identifiers to the means of obtaining information regarding the location.

Finally, during a step E60, the means for obtaining information regarding the location receive the current cell identifiers and determine, using the latter, information regarding the location. To finish, the module can transmit (to a remote operator, for example) an alert message including the information regarding the location.

Figure 4:
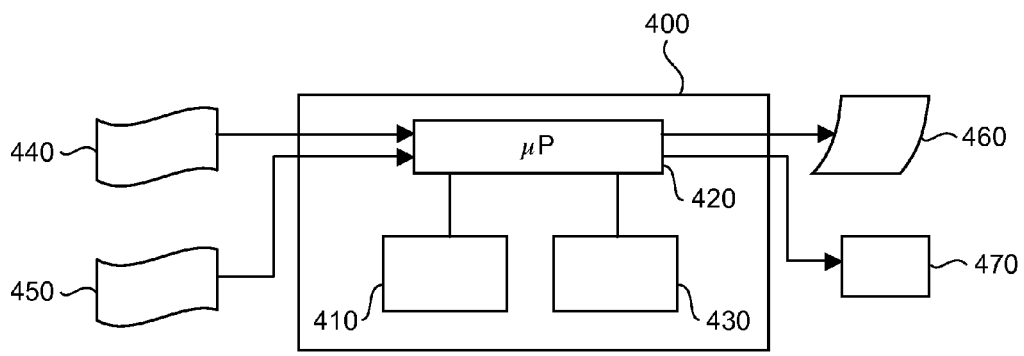
FIG. 4 shows the simplified structure of a particular embodiment of a radiocommunication module according to the invention.

FIG. 4 diagrammatically shows the structure of a radiocommunication module 400 according to a particular embodiment, which comprises a memory 410, and a processing unit 420 provided with a microprocessor µP, which is controlled by a computer program (or application) 430 implementing certain steps of the method according to an embodiment of the invention described in FIGS. 2 and 3. The processing unit 420 receives as input initialisation information 440 and carriers 450. The microprocessor µP processes this initialisation information and these carriers, according to the instructions of the program 430, in order to obtain information regarding the location 460 of the radiocommunication device and/or an activation signal 470.

Although the disclosure has been described hereinabove in relation with a limited number of embodiments, those skilled in the art, when reading this description, will understand that other embodiments can be imagined without leaving the scope of this disclosure.

In particular, the obtaining of initialisation information can consist, for example, for the radiocommunication module, in connecting on a daily basis to a remote server via a radiocommunication link of the GPRS type, or via a wired network when the device is, for example, having its battery charged.

Moreover, within the framework of a radiocommunication network of the UMTS type, the initialisation information can include, for example, a predetermined list of reference carriers and, for each reference carrier, a reference cell identifier and a scrambling code.

An illustrative embodiment of the disclosure provides a locating technique that is simple and effective to implement, in particular in terms of obtaining information regarding the location of a radiocommunication device.

An embodiment provides such a technique that is in particular well adapted to the detection of a position of a radiocommunication device in a predetermined geographical zone.

An embodiment provides such a technique that reduces the calculation time of the radiocommunication module GSM.

An embodiment provides such a technique that does not require the use of complex and expensive locating servers, in particular for obtaining information regarding the location.

An embodiment provides a GSM module with low electrical consumption.

An embodiment provides such a technique which is inexpensive and compatible with all of the existing radiocommunication modules.

The invention claimed is:

1. A method of locating a radiocommunication device in a radiocommunication network comprising a plurality of distinct geographical cells, said radiocommunication device comprising a radiocommunication module making possible reception of radiocommunication carriers, each carrier being associated with a cell of said network and being defined by a frequency, a power level and an identifier of said cell, wherein the method comprises the following steps performed by the module:
   obtaining initialisation information comprising a predetermined list of N1 reference carriers, with $N1 \geq 1$;
   selecting N carrier(s) from among the N1 reference carriers, with $1 \leq N \leq N1$;
   for each carrier selected, determining the cell identifier, referred to as a current cell identifier, associated with said carrier selected, using system information messages conveyed by said carrier;
   obtaining information regarding the location of said radiocommunication device, using the current cell identifier or identifiers.

2. The method according to claim 1, wherein said initialisation information includes furthermore, for each reference carrier, the cell identifier associated with said reference carrier, referred to as a reference cell identifier,
   and wherein said module furthermore performs the following step:
   detecting a position of said radiocommunication device in a reference geographical zone, according to the current cell identifier or identifiers and of the reference cell identifier or identifiers.

3. The method according to claim 2, wherein said initialisation information includes furthermore, for each reference carrier, the power level of said reference carrier, referred to as a reference power level,
   and wherein said module performs the following steps:
   for each carrier selected, determining the power level, referred to as a current power level, associated with said carrier selected;
   detecting said position of said radiocommunication device in said reference geographical zone, according furthermore to the current power level or levels and of the reference power level or levels.

4. The method according to claim 2, wherein, in the case of a positive detection of the position of said radiocommunication device in a reference geographical zone, said method comprises a step of activating a locating module included in the radiocommunication device.

5. The method according to claim 1, wherein said step of obtaining said initialisation information comprises a step of reading said initialisation information in a storage device included in the radiocommunication device.

6. The method according to claim 1, wherein said step of obtaining said initialisation information comprises the following step:
   said module receives said initialisation information coming from a source equipment.

7. The method according to claim 6, wherein said source equipment comprises a spy device, said predetermined list of N1 reference carriers containing at least certain of the carriers received by said spy device.

8. The method according to claim 6, wherein said source equipment comprises a server storing said initialisation information.

9. The method according to claim 8, wherein said server receives said initialisation information from said spy device.

10. The method according claim 1, each carrier conveying a plurality of system information messages among which a specific system information message comprising a cell identifier associated with said carrier, wherein said step of determining the current cell identifier of each carrier selected comprises a step of reading and decoding only said specific system information message comprising said cell identifier.

11. The method according to claim 10, wherein said specific system information message is a message of the SYS_INFO 3 type.

12. The method according to claim 1, wherein the step of selecting N carrier(s) is carried out in decreasing order of power level of reception by the radiocommunication module.

13. The method according claim 1, wherein the method comprises, carried out by said radiocommunication device, a step of transmitting said initialisation information to at least one other radiocommunication device of said radiocommunication network.

14. A computer readable memory comprising a computer program product recorded thereon, which comprises program code instructions for execution of a method of locating a radiocommunication device in a radiocommunication network, when said program is executed on a computer, wherein said radiocommunication network comprises a plurality of distinct geographical cells, said radiocommunication device comprising a radiocommunication module making possible reception of radiocommunication carriers, each carrier being associated with a cell of said network and being defined by a frequency, a power level and an identifier of said cell, wherein the method comprises the following steps performed by the module:

obtaining initialisation information comprising a predetermined list of N1 reference carriers, with N1≧1;

selecting N carrier(s) from among the N1 reference carriers, with 1≦N≦N1;

for each carrier selected, determining the cell identifier, referred to as a current cell identifier, associated with said carrier selected, using system information messages conveyed by said carrier; and obtaining information regarding the location of said radiocommunication device, using the current cell identifier or identifiers.

15. A radiocommunication module capable of receiving radiocommunication carriers, each carrier being associated with a geographical cell of a radiocommunication network comprising a plurality of distinct geographical cells, and being defined by a frequency, a power level and an identifier of said cell, said radiocommunication module being included in a radiocommunication device, wherein said module comprises:

means for obtaining initialisation information comprising a predetermined list of N1 reference carriers, with N1≧1;

means for selecting N carrier(s) from among the N1 reference carriers, with 1≦N≦N1;

first means for determining making it possible, for each carrier selected by said means for selecting, to determine the cell identifier, referred to as a current cell identifier, associated with said carrier selected, using system information messages conveyed by said carrier; and means for obtaining information regarding the location of said radiocommunication device in said radiocommunication network, using the current cell identifier or identifiers.

16. The radiocommunication module according to claim 15, wherein the module further comprises:

means for detecting a position of said radiocommunication device in a reference geographical zone;

second means for determining making it possible, for each carrier selected by said means for selecting, to determine the power level, referred to as the current power level, associated with said carrier selected, and wherein said means for detecting include:

first means for comparing the current cell identifier or identifiers and the reference cell identifier or identifiers; and second means for comparing the current power level or levels and the reference power level or levels.

* * * * *